United States Patent [19]
Kawano et al.

[11] Patent Number: 5,900,189
[45] Date of Patent: *May 4, 1999

[54] NEEDLE COKE FOR GRAPHITE ELECTRODES AND PROCESS FOR PRODUCING SAME

[75] Inventors: Youichi Kawano; Tsutomu Setou, both of Kitakyushu; Takanori Nishihata, Buzen, all of Japan

[73] Assignee: Nippon Steel Chemical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/722,134
[22] PCT Filed: Apr. 7, 1995
[86] PCT No.: PCT/JP95/00686
  § 371 Date: Sep. 30, 1996
  § 102(e) Date: Sep. 30, 1996
[87] PCT Pub. No.: WO95/27766
  PCT Pub. Date: Oct. 19, 1995

[30] Foreign Application Priority Data

Apr. 7, 1994 [JP] Japan .................................. 6-93804
  Oct. 14, 1994 [JP] Japan .................................. 6-249653

[51] Int. Cl.⁶ .................................................. C01B 31/00
[52] U.S. Cl. ........................................ 252/502; 423/445 R
[58] Field of Search ..................................... 423/265, 275, 423/445 R; 264/60, 63; 429/218, 221; 252/502, 504

[56] References Cited

U.S. PATENT DOCUMENTS

| | | | |
|---|---|---|---|
| 5,110,359 | 5/1992 | Orac et al. | 423/448 |
| 5,304,525 | 4/1994 | Immel et al. | 502/180 |

FOREIGN PATENT DOCUMENTS

| | | |
|---|---|---|
| 53-35801 | 7/1977 | Japan . |
| 55-110190 | 8/1980 | Japan . |
| 57-117585 | 7/1982 | Japan . |
| 59-122585 | 7/1984 | Japan . |
| 60-190491 | 9/1985 | Japan . |
| 2-51409 | 2/1990 | Japan . |
| 5-105881 | 4/1993 | Japan . |

*Primary Examiner*—Michael Lewis
*Assistant Examiner*—Stuart L. Hendrickson
*Attorney, Agent, or Firm*—Darby & Darby

[57] ABSTRACT

The present invention provides a needle coke for graphite electrodes, wherein a needle coke, used as a raw material coke, comprises a coke of 100 parts by weight, to which adheres a substance of 0.03 to 16 parts by weight having a softening point, or a melting point, or a temperature at which it thermally decomposes without leaving a residue (after subjecting it to a heat treatment at 200° C. or higher), which does not exceed 1800° C., which substance comprises preferably 0.05 to 5 parts by weight of at least one boron, phosphorus or silicon compound, or pyrex glass. Also provided is a process for producing the needle coke. The use of the above needle coke in producing graphite electrodes can effectively inhibit puffing in a graphitizing step and improve the yield of the electrodes as well as enhancing product characteristics.

7 Claims, No Drawings

NEEDLE COKE FOR GRAPHITE ELECTRODES AND PROCESS FOR PRODUCING SAME

TECHNICAL FIELD

The present invention relates to a needle coke having small puffing in producing electrodes and a process for producing the same.

BACKGROUND ART

Artificial graphite electrodes are produced by pulverizing a coal coke or a petroleum coke and classifying it to a fixed particle size distribution and then subjecting it to kneading with a binder pitch, extrusion-molding, baking, impregnation, secondary baking, and graphitization. In a graphitization step, calcined electrodes are graphitized at about 3000° C., wherein an Acheson furnace has so far mainly been used. In recent years, however, an LWG furnace (direct current flow type) has come to be mainly used. Since graphitization in this LWG furnace accelerates a temperature elevating rate, a generating rate of gas is increased, and therefore an abnormal expansion phenomenon called puffing is liable to take place. Puffing not only lowers a density of an electrode but also sometimes damages the electrode when the phenomenon is severe. Accordingly, processes for producing a needle coke having reduced puffing and puffing inhibitors added in producing electrodes have so far been investigated.

It is estimated that a puffing phenomenon takes place due to sulfur volatilized at temperatures of 1700° to 200° C. at which a graphite structure starts to be formed. Accordingly, iron oxide which reacts with sulfur to form sulfide to change the timing for the volatilization of sulfur is usually used as a puffing inhibitor (Japanese Patent Application Laid-Open No. Sho 55-110190). Further, various compounds as well as nickel compounds (Japanese Patent Application Laid-Open No. Sho 60-190491), titanium oxide (Japanese Patent Application Laid-Open No. Hei 2-51409) and the like have recently been proposed.

Further, as a process for a producing needle coke having puffing reduced without depending on a puffing inhibitor, a process is proposed in which pitch from which quinoline insoluble matters are removed is subjected to hydrorefining in the presence of a hydrogenating catalyst and then turned into a coke to thereby remove a nitrogen content or a sulfur content contained in the raw material pitch, which is an original substance causing puffing (Japanese Patent Publication No. Sho 59-122585).

On the other hand, a process is proposed as well in which a crude coke is subjected to a first stage baking at lower temperatures than ordinary calcining temperatures, for example, about 800° C., and after this is once cooled down, it is subjected again to a second stage calcination at temperatures falling in a range of 1200° to 1500° C. (Japanese Patent Publication No. Sho 53-35801).

Among these techniques, all of those depending on puffing inhibitors use the puffing inhibitors added in a step for kneading a coke with a binder pitch, and the effect thereof is varied depending on the kind of a coke used as a raw material For example, iron oxide has a defect that while it shows an excellent effect to a petroleum coke, it shows only a small effect to a coal coke. On the other hand, the processes which do not depend on puffing inhibitors have a problem that they have a difficulty in profitability and therefore have not yet been put to actual use or do not necessarily provide a satisfactory effect of reducing puffing.

Intensive researches made by the present inventors in order to solve the problems described above have resulted in finding that puffing caused in producing electrodes is reduced by adhering to a coke a substance having a softening point or a melting point which does not exceed 1800° C. after heating to 200° C. or higher, in producing a needle coke for a raw material of a graphite electrode, particularly boron compounds, and thus completing the present invention.

DISCLOSURE OF THE INVENTION

An object of the present invention is to provide a needle coke for graphite electrodes which can reduce puffing in producing the graphite electrodes regardless of the kind of raw material cokes from coal or petroleum and which can enhance the yield in a graphitization step and improve the product characteristics.

The present invention relates to:

1. a needle coke for graphite electrodes comprising a coke of 100 parts by weight and adhered thereto a substance of 0.03 to 16 parts by weight in which a softening point, or a melting point or a temperature at which it thermally decomposes without leaving a residue after subjecting it to a heat treatment at 200° C. or higher does not exceed 1800° C.;

2. a needle coke for graphite electrodes comprising a coke of 100 parts by weight and adhered thereto 0.05 to 5 parts by weight of at least one selected from a boron compound, a phosphorus compound, a silicon compound, and pyrex glass as the substance described in the above item 1; and with respect to a process for producing the same, 3. a process for producing the needle coke for graphite electrodes, comprising spraying or impregnating a green coke produced by delayed coking from at least one of petroleum and coal heavy oils used as a coke material with a suspension or a solution of the substance in which a softening point, or melting point, or a temperature at which it thermally decomposes without leaving a residue after subjecting it to a heat treatment at 200° C. or higher, does not exceed 1800° C., and then calcining the green coke;

4. a process for producing the needle coke for graphite electrodes as described in the above item 3, comprising spraying or impregnating a green coke produced by delayed coking from at least one of petroleum and coal heavy oils used as a coke material with a suspension or a solution of at least one selected from a boron compound, a phosphorus compound, a silicon compound, and pyrex glass, and then calcining the green coke;

5. a process for producing a needle coke for graphite electrodes as described in the above item 3, wherein in repeating calcination and cooling in a multistage, a calcined coke obtained up to a stage before calcination in the final stage is sprayed or impregnated with the suspension or the solution;

6. a process for producing a needle coke for graphite electrodes as described in the above item 4, wherein in repeating calcination and cooling in a multistage, a calcined coke obtained up to a stage before calcination in the final stage is sprayed or impregnated with the suspension or the solution;

7. a process for producing the needle coke for graphite electrodes as described in the above item 3, comprising spraying or impregnating a crude coke produced by delayed coking with a suspension or a solution of the substance in which a softening point, or melting point or a temperature at which it thermally decomposes without leaving a residue after subjecting it to a heat treatment at 200° C. or higher, does not exceed 1800° C., in or after cooling the coke after calcination, and then subjecting it to a heat treatment at temperatures of 200° C. or higher; and 8. a process for producing the needle coke for graphite electrodes as described in the above item 4, comprising spraying or impregnating a coke produced by delayed coking with a suspension or a solution of at least one selected from a boron compound, a phosphorus compound, a silicon compound, and pyrex glass, in or after cooling the coke after calcination, and then subjecting it to a heat treatment at temperatures of 200° C. or higher.

The present invention shall be explained below in detail.

There can be used as the coke used in the present invention, any of a conventional green needle coke having a volatile matter content of about 15% or less, which is produced by delayed coking from either one or both of petroleum series and coal series heavy oils used as a raw material, a calcined coke obtained up to a step before calcination in the final step in the case where calcination and cooling are repeated in a multistage, and a needle coke obtained after finishing the calcination.

Used as the coke-adhering substance used in the present invention for a purpose of reducing puffing is a substance in which a softening point, or a melting point or a temperature at which it thermally decomposes without leaving a residue after subjecting the substance to a heat treatment at 200° C. or higher does not exceed 1800° C. The softening point means a temperature at which a viscosity of the substance is lowered down to $10^{7.6}$ poise or less. This substance includes synthetic or natural high molecular substances such as natural rubber, polyamide resins, and PTFE which leave no carbon in thermal decomposition. From viewpoint of such an easiness in impregnating into pores as being soluble in water or easily dispersible in water, at least one selected from the group consisting of a boron compound, a phosphorus compound, a silicon compound, and pyrex glass is preferably used, and in particular, boric acid, phosphoric acid, silicic acid, and alkaline metal salts thereof are preferred.

These substances may be adhered to any of a green needle coke, a calcined coke obtained up to a step before calcination in the final stage in the case where calcination and cooling are repeated in a multistage, or a needle coke obtained after finishing the calcination. Used as means for adhering the substances to cokes is a method in which the substances are adhered to a surface of the coke or the pores present in the inside of the coke by spraying or impregnating with the suspension or the solution. When the substances dissolved in water or oil are used, a method can be used as well in which the substances are sprayed or impregnated in the form of solutions of suitable solvents. Spraying alone evenly with a spray can be applied as a method for spraying or impregnating, or a method in which a coke is impregnated with the solution by means of a decompression device can be used. When the substances are applied in the form of a suspension, they have preferably such small particle diameters that the substances can get into the inside of a coke. Usually, the substances having a diameter of 100 $\mu$m or less, preferably 50 $\mu$m or less are used.

An amount of these substances adhered to a coke is 0.03 to 16 parts by weight per 100 parts by weight of the coke, and in the case of at least one selected from a boron compound, a phosphorus compound, a silicon compound, and pyrex glass, the amount is preferably 0.05 to 5 parts by weight, more preferably 0.1 to 2 parts by weight. When the adhering amount is insufficient deviating from these ranges, a puffing-reducing effect is not sufficiently high in terms of practical use. On the other hand, when the adhering amount is excessive, not only an effect for increasing the amount is not notably revealed, but also the residual ash content exerts an effect which is not preferred in terms of the quality of product electrodes depending on the uses thereof.

After spraying or impregnating a green needle coke with the suspension or the solution of these substances, the green needle coke continues to be calcined as it is and can be used as a material coke for graphite electrodes. In this case, the calcination may be carried out at, for example, 1200° to 1600° C. in one stage as usual, or multistage calcination may be carried out, wherein a green needle coke is baked in the first stage at lower calcining temperatures than usual, for example, about 800° C., and then this is once cooled down and calcined again in the second stage at temperatures falling in a range of 1200° to 1600° C. Further, in a method in which a green needle coke which is not sprayed or impregnated with the suspension or the solution of these substances is repeatedly calcined and cooled down, a half-calcined needle coke obtained up to a stage before the calcination in the final stage may be sprayed or impregnated with the suspension or the solution of these substances. Further, the needle coke may be sprayed or impregnated with the suspension or the solution of these substances in or after cooling the needle coke after the calcination. In this case, however, it is required to subject the coke further to a heat treatment at 200° C. or higher after that.

In preparing electrodes from the material cokes obtained by the methods described above, iron compounds usually used as puffing inhibitors may be omitted to use, but the use thereof is more preferred since an effect of further reducing puffing can be obtained. They can suitably be selected taking the required quality and the profitability into consideration.

A mechanism of actions exerted to puffing by the substances adhered to coke shall be explained below. These substances can be adhered and penetrated into the pores of a coke by spraying or impregnating a crude needle coke or a calcined needle coke with a suspension or a solution of the substances. Then, by heating or calcining these substances at 200° C. or higher, water is evaporated or in some substances, dehydration or melting takes place whereby these substances or the reaction products remain and are adhered to the pores.

Electrodes are produced from the needle coke thus prepared.

Electrodes are produced in a kneading step, a baking step, an impregnating step, a secondary baking step, and a graphitizing step. Kneading of a needle coke, to which these substances are adhered, with a binder pitch prevents the binder pitch from penetrating into the depth of the pores due to the substances remaining and adhering in the pores of the coke. Accordingly, this substance may be any one as long as it can remain in the form of a solid matter at 200° C. or higher and binder and impregnated pitch-kneading temperatures and is molten, softened or thermally decomposes to leave no residue up to 1800° C. In impregnation after baking, the substances contained in the pores can prevent an impregnated pitch from penetrating into the depth of the pores as is the case with a binder pitch.

Next, the electrodes thus prepared is subjected to secondary baking and then to graphitization.

In the graphitization, dissipation due to a vapor pressure of the substances contained in the pores, or deformation due to melting takes place first to secure air holes in the pores, whereby passages for gas generated from a coke substrate in the graphitization can be secured.

Gas causing puffing starts to be generated at about 1700° C., and a generating ratio thereof increases at about 1800° C. Accordingly, a softening point or a melting point of the substances contained in the pores, or a temperature at which the substances thermally decompose without leaving a residue is required to be 1800° C. or lower.

Thus, a generating pressure of gas in a closed space of the pore, which causes puffing, can be reduced, and therefore the puffing can be decreased

PREFERRED EMBODIMENTS FOR CARRYING OUT THE INVENTION

The present invention shall concretely be explained with reference to examples and comparative examples, but the present invention shall not be restricted by them.

EXAMPLE 1

Used was a needle coke prepared by calcining a green needle coke produced from a coal heavy oil used as a raw material by delayed coking. The calcined needle coke of 3 kg was sprayed with a disodium phosphate aqueous solution of 1.5 kg having a concentration of 10% by weight, and after leaving for standing for 30 minutes, the needle coke was dried at 150° C. and then further subjected to a heat treatment at 900° C. The puffing and the coefficient of thermal expansion (hereinafter called CTE) were determined by the methods described later, and the results thereof are shown in Table 1.

EXAMPLE 2

Used was a needle coke prepared by calcining a green needle coke produced from a coal heavy oil used as a raw material by delayed coking. The calcined needle coke of 3 kg was sprayed with a sodium silicate aqueous solution of 1.5 kg having a concentration of 10% by weight, and after leaving for standing for 30 minutes, the needle coke was dried at 150° C. and then further subjected to a heat treatment at 900° C. The puffing and the CTE were determined by the methods described later, and the results thereof are shown in Table 1.

EXAMPLE 3

Used was a needle coke prepared by calcining a green needle coke produced from a coal heavy oil used as a raw material by delayed coking. The calcined needle coke of 3 kg was sprayed with a disodium phosphate aqueous solution of 15 kg having a concentration of 10% by weight, and after leaving for standing for 30 minutes, the needle coke was dried at 150° C. and then further subjected to a heat treatment at 900° C. In a conventional process for producing electrodes from the above needle coke used as a raw material, iron oxide of 1 part by weight was added to the coke of 100 parts by weight and a binder pitch of 30 parts by weight in kneading, and then an electrode was prepared. The puffing and the CTE were determined by the methods described separately, and the results thereof are shown in Table 1.

EXAMPLE 4

Used was a needle coke prepared by calcining a green needle coke produced from a coal heavy oil used as a raw material by delayed coking. Then, pyrex glass (composition $SiO_2:B_2O_3:Al_2O_3:Na_2O=81:13:2:4$) was pulverized with a crusher, and the particle size was adjusted to 200 mesh sieve through A 10 weight % pyrex glass suspension was prepared therefrom, and the calcined needle coke of 3 kg was sprayed with the suspension of 1.0 kg. After leaving for standing for 30 minutes, the needle coke was dried at 150° C. and subjected to a heat treatment at 1200° C.

The puffing and the CTE were determined by the methods described later, and the results thereof are shown in Table 1.

EXAMPLE 5

Used was a green needle coke produced from a coal heavy oil used as a raw material by delayed coking. The green needle coke of 3 kg was sprayed with a boric acid aqueous solution of 1.5 kg having a concentration of 10% by weight, and after leaving for standing for 30 minutes, the needle coke was dried at 150° C. and then calcined at 1400° C. The puffing and the CTE were determined by the methods described later, and the results thereof are shown in Table 2.

EXAMPLE 6

Used was a needle coke prepared by calcining a green needle coke produced from a coal heavy oil used as a raw material by delayed coking. The calcined needle coke of 3 kg was sprayed with a boric acid aqueous solution of 1.5 kg having a concentration of 10% by weight, and after leaving for standing for 30 minutes, the needle coke was dried at 150° C. and then further subjected to a heat treatment at 900° C. The puffing and the CTE were determined by the methods described later, and the results thereof are shown in Table 2.

EXAMPLE 7

Used was a needle coke prepared by calcining a green needle coke produced from a petroleum heavy oil used as a raw material by delayed coking. The calcined needle coke of 3 kg was sprayed with a boric acid aqueous solution of 1.5 kg having a concentration of 10% by weight, and after leaving for standing for 30 minutes, the needle coke was dried at 150° C. and then further subjected to a heat treatment at 900° C. The puffing and the CTE were determined by the methods described later, and the results thereof are shown in Table 2.

EXAMPLE 8

Used was a needle coke prepared by calcining a green needle coke produced from a coal heavy oil used as a raw material by delayed coking. The calcined needle coke of 3 kg was sprayed with a boric acid aqueous solution of 1.5 kg having a concentration of 10% by weight, and after leaving for standing for 30 minutes, the needle coke was dried at 150° C. and then further subjected to a heat treatment at 900° C. In a conventional process for producing electrodes from the above needle coke used as a raw material, iron oxide of 1 part by weight was added to the coke of 100 parts by weight and the binder pitch of 30 parts by weight in kneading, and then an electrode was prepared. The puffing and the CTE were determined by the methods described later, and the results thereof are shown in Table 2.

Comparative Examples 1 and 2

In a conventional process for producing electrodes from a conventional coal series calcined needle coke falling in the outside of the present invention, iron oxide of 1 part by weight was added or not added to the coke of 100 parts by weight and the binder pitch of 30 parts by weight in kneading, and then electrodes were prepared. The puffing and the CTE were determined by the methods described later, and the results thereof are shown in Table 1.

Comparative Examples 3 and 4

In a conventional process for producing electrodes from a conventional petroleum series calcined needle coke falling in the outside of the present invention, iron oxide was added or not added to the coke of 100 parts by weight and the binder pitch of 30 parts by weight in kneading, and then electrodes were prepared. The puffing and the CTE were determined by the methods described later, and the results thereof are shown in Table 2.

Comparative Example 5

In a conventional process for producing electrodes from a conventional coal series needle coke falling in the outside of the present invention, boric acid of 1 part by weight was added to the coke of 100 parts by weight and the binder pitch of 30 parts by weight in kneading, and then an electrode was prepared. The puffing and the CTE were determined by the methods described later, and the results thereof are shown in Table 2.

Comparative Example 6

In a conventional process for producing electrodes from a conventional coal series needle coke falling in the outside of the present invention, boron oxide of 1 part by weight was added to the coke of 100 parts by weight and the binder pitch of 30 parts by weight in kneading, and then an electrode was prepared. The puffing and the CTE were determined by the methods described later, and the results thereof are shown in Table 2.

Comparative Example 7

Used was a needle coke prepared by calcining a green needle coke produced from a coal heavy oil used as a raw material by delayed coking.

Then, metal boron was pulverized with a crusher, and the particle size was adjusted to 200 mesh sieve through. A 5 weight % aqueous suspension was prepared therefrom, and the calcined needle coke of 3 kg was sprayed with the suspension of 1.0 kg. After leaving for standing for 30 minutes, the needle coke was dried at 150° C. and subjected to a heat treatment at 900° C.

The puffing and the CTE were determined by the methods described later, and the results thereof are shown in Table 2.

The puffing and the CTE were determined in the following manners.

Determination of puffing

After pulverizing a coke, the particle size is adjusted (8 to 16 mesh: 40%, 48 to 200 mesh: 35%, and 200 mesh or less: 25%), and the pulverized coke is blended with a binder pitch of 30% at 160° C. for 20 minutes This is molded into a size of 20 mm$\phi$×100 mm. A molded test piece is baked up to 900° C. in a electric furnace, and after impregnated with an impregnating pitch, the test piece is subjected again to a secondary baking at 900° C. This is used as a sample for determining the puffing. In determining the puffing, the test piece is heated up to 2500° C. at a temperature-elevating rate of 10° C./min, and the puffing is expressed by a maximum elongation percentage at 1500° to 2500° C.

Determination of CTE

After pulverizing a coke, the particle size is adjusted (16 to 60 mesh: 20%, 60 to 200 mesh: 45%, and 200 mesh or less: 35%), and the pulverized coke is blended with a binder pitch at 160° C. for 20 minutes. An addition amount of the binder pitch is selected so that molded BD is maximized. This is extrusion-molded into a size of 20 mm$\phi$×100 mm. After molding, a molded test piece is baked at 900° C. and graphitized at 2500° C. to prepare a sample for determining the CTE. An average coefficient of thermal expansion at RT~500° C. is measured to determine the CTE.

Determination of softening point

An outer cylinder of a device for determining a glass viscosity by a rotating cylinder method is stopped in a position where the cylinder is rotated by some angle, and the time spent for causing an inner cylinder rotated accordingly to return to the initial position is determined, wherein the softening point is defined by a temperature at which the reduced viscosity is $10^{7.6}$ poise ("Glass Engineering" written by S. Naruse, published by Kyoritsu Shuppan Co., Ltd.).

Determination of melting point

A sample is put in a crucible equipped with a thermo couple, and the temperature is elevated, wherein the melting point is defined by a stagnation or curvature point of the temperature in a temperature-time curve ("Base of Thermal Analysis" written by Y. Saito, published by Kyoritsu Shuppan Co., Ltd.).

Determination of graphitized BD

The volume is determined from the diameter and the length of a test piece, and the weight is measured as well to calculate the bulk density by dividing the weight by the volume.

The respective examples are improved in the puffings to a large extent as compared with those of the corresponding comparative examples. A significant difference in the CTE is not found between both.

TABLE 1

|  | Example | | | | Comparative Example | |
| --- | --- | --- | --- | --- | --- | --- |
|  | 1 | 2 | 3 | 4 | 1 | 2 |
| Substance to be adhered | Disodium phosphate | Sodium silicate | Disodium phosphate | Pyrex glass | — | — |
| Adhering amount (%) per 100 parts by weight of coke | 1.2 | 1.3 | 1.2 | 1.1 |  |  |
| Kind of puffing inhibitor and added amount thereof per 100 parts by weight of coke | — | — | Iron oxide 1 part by weight | — |  | Iron oxide 1 part by weight |
| Puffing (%) | 1.0 | 1.1 | 0.8 | 1.3 | 2.0 | 1.5 |
| CTE (×$10^{-6}$/° C.) | 1.02 | 1.01 | 1.02 | 1.02 | 1.00 | 1.02 |
| Graphitized BD | 1.55 | 1.55 | 1.57 | 1.54 | 1.52 | 1.53 |
| Melting point or softening point of adhered substance* | 983 | 1088 | 983 | 820 | — | — |

*softening point in Example 4 and melting points in the other examples

TABLE 2

|  | Example | | | |
| --- | --- | --- | --- | --- |
|  | 5 | 6 | 7 | 8 |
| Substance to be adhered | Boric acid | Boric acid | Boric acid | Boric acid |
| Adhering method and treating conditions | Calcining after sprayed on green coke | Heat treatment after sprayed on calcined coke | Heat treatment after sprayed on calcined coke | Heat treatment after sprayed on calcined coke |
| Adhering amount (%) per 100 parts by weight of coke | 1.0 | 0.9 | 0.8 | 0.9 |
| Kind of puffing inhibitor and added amount thereof per 100 parts by weight of coke | — | — | — | Iron oxide 1 part by weight |
| Puffing (%) | 1.0 | 0.9 | 0.8 | 0.8 |
| CTE (×10$^{-6}$/° C.) | 1.02 | 1.00 | 1.15 | 1.00 |
| Graphitized BD | 1.55 | 1.56 | 1.56 | 1.58 |
| Melting point or softening point of adhered substance | 577 | 577 | 577 | 577 |

|  | Comparative Example | | | | |
| --- | --- | --- | --- | --- | --- |
|  | 3 | 4 | 5 | 6 | 7 |
| Substance to be adhered | — | — | Boric acid Added in preparing electrode | Boron oxide Added in preparing electrode | Boron Heat treatment after sprayed on calcined coke |
| Adhering method and treating conditions |  |  |  |  |  |
| Adhering amount (%) per 100 parts by weight of coke | — | — | — | — | 1.3 |
| Kind of puffing inhibitor and added amount thereof per 100 parts by weight of coke | Iron oxide 1 part by weight | Iron oxide not added | (1.0)* | (1.0)* | — |
| Puffing (%) | 0.9 | 1.9 | 1.3 | 1.5 | 1.5 |
| CTE (×10$^{-6}$/° C.) | — | 1.16 | 1.02 | 1.02 | 1.02 |
| Graphitized BD | 1.55 | 1.52 | 1.46 | 1.50 | 1.52 |
| Melting point or softening point of adhered substance* | — | — | 577** | 577** | 2150 |

Adhering amount per 100 parts by weight of the coke
-Shown is an amount adhered to the surface and the inner pores of the calcined needle coke.
-When sprayed on the green needle coke, shown is a value calculated considering a yield in preparing the calcined needle coke from the green needle coke.
*One part by weight of boric acid in Comparative Example 5 and one part by weight of boron oxide in Comparative Example 6 are amounts added when they are added as the alternatives of the inhibitor.
**Values determined after subjecting the additives to a heat treatment at 200° C. or higher, respectively.

Application Possibility for Industrial Use

In producing the needle coke for a graphite electrode raw material according to the present invention, the use of a coke in which adhered to the pores thereof is a substance in which a softening point, or a melting point or a temperature at which it thermally decomposes without leaving a residue measured after subjecting it to a heat treatment at 200° C. or higher does not exceed 1800° C., for example, a boron compound, disodium phosphate, sodium silicate, and pyrex glass can effectively inhibit puffing in a graphitizing step and improve the yield of an electrode as well as enhancing the product characteristics, which in turn can provide a considerable amount of an industrial profit

What is claimed is:

1. A process for producing a needle coke for graphite electrodes, comprising
   (i) spraying or impregnating a green coke with a suspension or a solution of at least one compound or glass selected from the group consisting of a boron compound, a silicon compound, and a borosilicate glass,
   wherein said green coke is produced by delayed coking from at least one of petroleum and coke heavy oils used as a coke material, and said at least one compound or glass sprayed on or impregnated in the green coke is in an amount of about 0.05 to 5 parts by weight per 100 parts by weight of coke; and
   (ii) calcining the green coke.

2. The process of claim 1, including the additional steps of preparing a graphite electrode from said coke comprising (1) kneading the needle coke with a binder pitch, (2) baking, (3) secondary baking and (4) graphitizing.

3. A process for producing a needle coke for graphite electrodes comprising
   (i) at least once calcining and cooling a green needle coke, thereby obtaining a half-calcined coke;
   (ii) spraying or impregnating the half-calcined coke with a suspension or solution of at least one compound or glass selected from the group consisting of a boron compound, a silicon compound, and a borosilicate glass,
   wherein said at least one compound or glass sprayed on or impregnated in the half-calcined coke is in an amount of about 0.05 to 5 parts by weight per 100 parts by weight of coke; and
   (iii) calcining the half-calcined coke.

4. The process of claim 3, including the additional steps of preparing a graphite electrode from said coke comprising (1) kneading the needle coke with a binder pitch, (2) baking, (3) secondary baking and (4) graphitizing.

5. A process for producing the needle coke for graphite electrodes as described in claim 1, wherein said process further comprises cooling the coke after calcination, and then subjecting it to a heat treatment at temperatures of 200° C. or higher.

6. A process for producing a needle coke for graphite electrodes, comprising
  (i) at least once calcining and cooling a green coke;
  (ii) spraying or impregnating the calcined coke with a suspension or solution of at least one compound or glass selected from the group consisting of a boron compound, a phosphorus compound, a silicon compound, and a borosilicate glass,
  wherein said compound or glass sprayed on or impregnated in the green coke is in an amount of about 0.05 to 5 parts by weight per 100 parts by weight of coke; and
  (iii) heat treating at 200° C. or higher so as to dry the compound or glass, thereby causing said compound or glass to adhere in pores of the coke.

7. The process of claim 6, including the additional steps of preparing a graphite electrode from said coke comprising (1) kneading the needle coke with a binder pitch, (2) baking, (3) secondary baking and (4) graphitizing.

* * * * *